US 8,739,762 B2

(12) United States Patent
Miyata et al.

(10) Patent No.: US 8,739,762 B2
(45) Date of Patent: Jun. 3, 2014

(54) ENGINE CONTROLLING APPARATUS

(75) Inventors: Toshiyuki Miyata, Okazaki (JP);
Katsunori Ueda, Okazaki (JP); Hitoshi Toda, Okazaki (JP); Koji Shibata, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 548 days.

(21) Appl. No.: 13/070,823

(22) Filed: Mar. 24, 2011

(65) Prior Publication Data
US 2012/0083991 A1  Apr. 5, 2012

(30) Foreign Application Priority Data

Oct. 1, 2010  (JP) ................... 2010-224014

(51) Int. Cl.
*F02D 1/00*  (2006.01)
(52) U.S. Cl.
USPC .............. 123/339.1; 123/339.11; 123/406.23; 123/406.47
(58) Field of Classification Search
USPC .............. 123/406.23, 406.47, 406.52, 339.1, 123/339.11, 339.12, 344
See application file for complete search history.

(56) References Cited

U.S. PATENT DOCUMENTS

| | | | | |
|---|---|---|---|---|
| 5,151,861 A * | 9/1992 | Danno et al. .................... 701/90 |
| 5,495,835 A * | 3/1996 | Ueda ...................... 123/339.11 |
| 5,662,084 A | 9/1997 | Deguchi et al. |
| 6,497,212 B2 * | 12/2002 | Matsumoto et al. .......... 123/295 |
| 6,959,691 B2 * | 11/2005 | Ueda et al. ............... 123/339.21 |
| 7,143,741 B2 | 12/2006 | Yagi |
| 7,461,621 B2 * | 12/2008 | Ota et al. .................... 123/179.4 |
| 8,036,817 B2 * | 10/2011 | Ota et al. ....................... 701/113 |
| 2002/0056583 A1 * | 5/2002 | Takano et al. ................. 180/197 |
| 2002/0134350 A1 * | 9/2002 | Takano et al. ................. 123/349 |
| 2006/0102143 A1 | 5/2006 | Yagi |

FOREIGN PATENT DOCUMENTS

| | | |
|---|---|---|
| JP | 61-96146 A | 5/1986 |
| JP | 1-193040 A | 8/1989 |
| JP | 9-32612 A | 2/1997 |
| JP | 9-280097 A | 10/1997 |
| JP | 2002-115596 A | 4/2002 |
| JP | 2004-197723 A | 7/2004 |
| JP | 2006-138300 A | 6/2006 |

* cited by examiner

*Primary Examiner* — John Kwon
(74) *Attorney, Agent, or Firm* — Birch, Stewart, Kolasch & Birch, LLP

(57) ABSTRACT

An engine controlling apparatus includes an idle speed setting unit that sets a target idle speed upon idling of an engine mounted on a vehicle, and a target torque setting unit that sets a target torque in response to the target idle speed. The apparatus further includes an ignition timing controlling unit that controls an ignition timing and an intake air amount controlling unit that controls an intake air amount, and a steering angle detection unit that detects a steering angle. The apparatus further includes a torque value setting unit that sets a torque value in response to the steering angle. The intake air amount controlling unit controls the intake air amount in response to both the target torque and the torque value. The ignition timing controlling unit controls the ignition timing so that the engine outputs the target torque.

2 Claims, 5 Drawing Sheets

ENGINE CONTROLLING APPARATUS

CROSS-REFERENCE TO THE RELATED APPLICATION

This application incorporates by references the subject matter of Application No. 2010-224014 filed in Japan on Oct. 1, 2010 on which a priority claim is based under 35 U.S.C. §119(a).

BACKGROUND OF THE INVENTION

1. Field of the Invention

The embodiments disclosed herein are related to a controlling apparatus for controlling an engine mounted on a vehicle.

2. Description of the Related Art

Conventionally, a controlling apparatus for controlling an idle speed of an engine mounted on a vehicle is known. In the controlling apparatus, idle control for controlling the engine speed to a target engine speed is carried out in the case where the driving state of the vehicle satisfies a predetermined idle condition. As a particular example of the idle control, feedback control of an intake air amount to the engine, an ignition timing of each cylinder of the engine and so forth are available.

Incidentally, the engine speed fluctuates in response to the load acting upon the engine. Since the idle speed is set lower than the engine speed upon normal vehicle running, if an external load acts upon the engine during idle operation, then there is the possibility that the engine may stall. From such a point of view as just described, various techniques regarding control for securing idle stability have been developed.

For example, in Japanese Patent Laid-Open No. 61-96146, idle control for a vehicle including a power steering apparatus is disclosed. According to the idle control, a power steering correction term is calculated based on an angular speed ω of a steering angle, and the intake air amount is controlled based on the calculated value. By such a configuration as just described, fluctuation of the idle speed can be prevented.

However, the external load acting upon the engine upon the steering operation fluctuates in response to the angle of the steering wheel. For example, in a hydraulic power steering apparatus for driving a steering pump to assist the steering force, the magnitude of a load generated in a state in which the steering wheel is fully operated is higher than that at a steering position at or around the neutral position of the steering wheel. Also in an electrically-operated power steering apparatus, the load acting upon the engine increases as the steering angle increases. Accordingly, in such conventional idle control which is based on the angular speed ω as disclosed in Japanese Patent Laid-Open No. 61-96146, there is a subject that it is difficult to calculate an accurate value of the external load and the idle stability is liable to degrade.

Also it is imaginable to set, regarding the idle stability, the idle speed rather high in advance to avoid stall of the engine. For example, in the technique disclosed in Japanese Patent Laid-Open No. 61-96146, the intake air amount is controlled rather great in advance. However, in this instance, the engine rotates excessively irrespective of the magnitude of the external load, and energy loss increases to degrade the fuel cost.

SUMMARY OF THE INVENTION

The present invention has been made in view of such subjects as described above, and it is an object of the present invention to improve the fuel cost while enhancing the idle stability of an engine with a simple configuration.

It is to be noted that, in addition to the object described above, also it shall be understood as an object of the present invention to achieve such working effects as are provided by the constitutions of several modes for carrying out the present invention hereinafter described but are not provided by the conventional techniques.

According to an aspect of the embodiment, an engine controlling apparatus disclosed herein includes an idle speed setting unit that sets a target idle speed upon idling of an engine mounted on a vehicle, and a target torque setting unit that sets a target torque (for example, an idle demand torque Pi_NeFB) in response to the target idle speed set by the idle speed setting unit.

The engine controlling apparatus further includes an ignition timing controlling unit that controls an ignition timing of the engine and an intake air amount controlling unit that controls an intake air amount of the engine so that the target torque set by the target torque setting unit is implemented, and a steering angle detection unit that detects a steering angle of a steering wheel of the vehicle.

Further, the engine controlling apparatus includes a torque value setting unit that sets a torque value (for example, an external load addition torque Pi_ADD) in response to the steering angle detected by the steering angle detection unit.

Here, the intake air amount controlling unit controls the intake air amount in response to the target torque and the torque value.

The ignition timing controlling unit controls the ignition timing so that the engine outputs the target torque set by the target torque setting unit.

For example, the torque value set by the torque value setting unit is an addition torque for increasing the target torque set by the target torque setting unit and preferably has a positive value.

With the engine controlling apparatus disclosed herein, by setting a torque value based on the steering angle and controlling the intake air amount in response to the torque value and besides controlling the ignition timing to a target torque, the maximum torque obtained at the MBT can be increased. In particular, the torque reserve amount can be increased readily without causing the actual output torque to fluctuate taking a load fluctuation caused by a steering operation upon idle control into consideration.

BRIEF DESCRIPTION OF DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE INVENTION

An engine controlling apparatus is described with reference to the drawings. It is to be noted that the embodiment hereinafter described is illustrative to the end, and there is no intention to eliminate various modifications and applications of the technique not specified in the embodiment hereinafter described.

[1. Apparatus Configuration]

Figure 1:
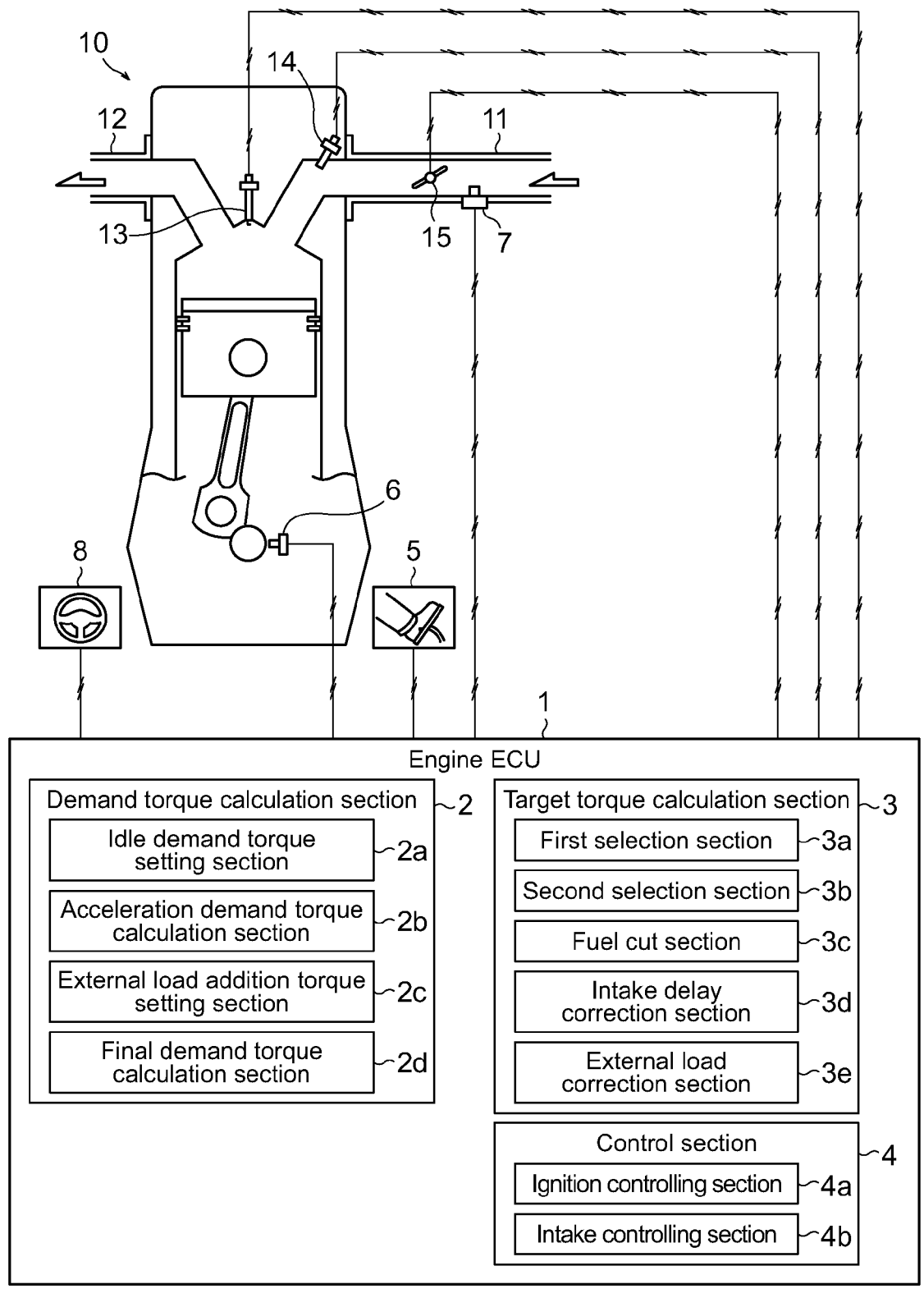
FIG. 1 is a block diagram schematically illustrating a configuration of an engine controlling apparatus according to an embodiment of the present invention.

The controlling apparatus of the present embodiment is applied to a vehicle-carried engine 10 illustrated in FIG. 1. Here, one of a plurality of cylinders provided in a multicylinder four-cycle type engine 10 is illustrated. An ignition plug 13 is provided at the top of the cylinder in a state in which a tip end thereof is projected to the combustion chamber side. Further, an intake path 11 and an exhaust path 12 are connected to a top face of the combustion chamber on the cylinder head side.

An injector 14, an ETV (Electric Throttle Valve) 15 and an air flow sensor (AFS) 7 are provided on the intake path 11 side. The injector 14 injects fuel into the intake path 11. The ETV 15 is an electronically-controlled throttle valve for changing the opening thereof to change the intake amount of air to be introduced into the cylinder. Further, the air flow sensor 7 is a sensor for detecting the intake air amount, and here, an intake air flow rate Q passing through the ETV 15 is detected.

A crank angle sensor 6 for detecting an angle $\theta_{CR}$ of a crankshaft is provided in the engine 10. The angle $\theta_{CR}$ of the crankshaft detected by the crank angle sensor 6 and the intake air flow rate Q detected by the air flow sensor 7 are transmitted to an engine ECU 1 (controlling unit) hereinafter described. It is to be noted that an engine speed Ne can be grasped from a variation amount of the angle $\theta_{CR}$ per unit time. Accordingly, the crank angle sensor 6 has a function as means for detecting the engine speed Ne of the engine 10. A configuration may be applied wherein the engine speed Ne is calculated by the engine ECU 1 based on the angle $\theta_{CR}$ of the crankshaft detected by the crank angle sensor 6, or another configuration may be applied wherein the engine speed Ne is calculated in the inside of the crank angle sensor 6.

At an arbitrary position of a vehicle on which the engine 10 is mounted, an acceleration pedal sensor 5 (APS, Acceleration pedal Position Sensor, acceleration operation amount detection unit) for detecting an operation amount $\theta_{AC}$ corresponding to a treadling amount of an acceleration pedal and a steering angle sensor 8 (SAS, Steering Angle Sensor, steering angle detection unit) for detecting an operation angle (steering angle) θ_SAS of the steering wheel are provided. The treadling operation amount $\theta_{AC}$ of the acceleration pedal is a parameter corresponding to an acceleration request from the driver, or in other words, the treadling operation amount $\theta_{AC}$ is a parameter correlating to a load to the engine 10.

Further, the steering force by the steering wheel of the vehicle in the present embodiment is assisted by a hydraulic power steering apparatus, and the load to the engine 10 increases as the steering angle θ_SAS increases. Accordingly, also the steering angle θ_SAS is a parameter correlating to the load to the engine 10. The operation amount $\theta_{AC}$ of the acceleration pedal and the steering angle θ_SAS detected by the sensors are transmitted to the engine ECU 1.

The engine ECU 1 (Engine—Electronic Control Unit, engine electronic controlling apparatus) is an LSI device in which, for example, a microprocessor, a ROM, a RAM and so forth are integrated, and is an electronic controlling apparatus for controlling various systems such as an ignition system, a fuel system, an intake and exhaust system and a valve system regarding the engine 10. Here, the behavior of the engine 10 is managed by torque-based control (torque demand control).

In the torque-based control, an intake air amount, a fuel injection amount, an ignition timing and so forth are controlled with reference to the magnitude of torque demanded by the engine 10. Operations of the ignition plug 13, injector 14 and ETV 15 described above are adjusted by the torque-based control. In the torque-based control, a target value of the engine torque is calculated based, for example, on the acceleration opening, engine speed and so forth, and the apparatuses which are control targets are controlled so that the torque of the target value is obtained.

The engine ECU 1 is connected to a different electronic controlling apparatus through a communication line such as a CAN, a FlexRay or the like provided in the vehicle. The engine ECU 1 has a function for totally deciding a torque demanded from the driver and torques demanded from external control systems to adjust the torque to be actually generated by the engine 10. As the external control systems here, a CVT-ECU (Continuously Variable Transmission-Electronic Control Unit) for controlling operation of a CVT apparatus (variable speed apparatus), an ESC (Electronic Stability Controller) for carrying out control for stabilizing the posture of the vehicle, an auxiliary engine ECU and so forth are available. The engine ECU 1 converts output requests from the external control systems to the engine 10 into torques and comprehensively controls the torque behavior of the engine 10.

The torque-based control carried out by the engine ECU 1 in the present embodiment includes idle feedback control and fuel cut control. The idle feedback control is feedback control for adjusting the actual engine speed Ne toward a target idle speed and maintaining engine speed at the target idle speed upon idling of the engine 10 when a predetermined idle condition (for example, a condition regarding the engine speed Ne or the treadling operation amount $\theta_{AC}$ of the acceleration pedal) is satisfied. Meanwhile, the fuel cut control is control for stopping injection of the fuel when a predetermined fuel cut condition (for example, a condition regarding the engine speed Ne or the treadling operation amount $\theta_{AC}$ of the acceleration pedal) is satisfied, and is carried out by a fuel cut controlling section not shown in the engine ECU 1.

[2. Controlling Configuration]

The engine ECU 1 (controlling unit) includes a demand torque calculation section 2, a target torque calculation section 3 and a control section 4. The demand torque calculation section 2 aggregates a torque demanded from the driver and torques demanded from the external control systems to calculate two kinds of demand torques whose responsibilities to a controlling operation are different from each other. Here, an ignition controlling demand torque Pi_EXT_SA and an intake controlling demand torque Pi_EXT are calculated.

The ignition control is so-called high-response torque control and controls the torque in accordance, for example, with an ignition timing operation or a fuel injection amount operation. Meanwhile, the intake control is so-called low-response torque control and controls the torque in accordance, for example, with an intake air amount operation represented by an operation of the electronically controlled throttle. Generally, in the ignition control, the adjustment margin of the torque is small while the responsibility is high, but in the intake control, the responsibility is low while the adjustment margin of the torque is great. The two kinds of the demand torques calculated here are transmitted to the target torque calculation section 3.

The target torque calculation section 3 (torque value setting unit) calculates target torques as two kinds of controlling targets based on the ignition controlling demand torque Pi_EXT_SA and the intake controlling demand torque Pi_EXT calculated by the demand torque calculation section 2. Here, an ignition controlling target torque Pi_TGT (first target torque) and an intake controlling target torque Pi_ETV_STD (second target torque) are calculated. The ignition controlling target torque Pi_TGT and the intake controlling target torque Pi_ETV_STD calculated here are transmitted to the control section 4.

The control section 4 controls the intake air amount (actual charging efficiency Ec) and the ignition timing of the ignition plug 13 based on the two kinds of the target torques calculated by the target torque calculation section 3. The opening of the ETV 15 is controlled based on the intake controlling target torque Pi_ETV_STD, and the ignition timing of the ignition plug 13 is controlled based on the ignition controlling target torque Pi_TGT.

It is to be noted that the functions of the demand torque calculation section 2, target torque calculation section 3 and control section 4 may be implemented by an electronic circuit (hardware) or may be implemented as programmed software. Or, part of the functions may be provided as hardware and remaining part of the functions may be provided as software.

[2-1. Demand Torque Calculation Section]

Figure 2:
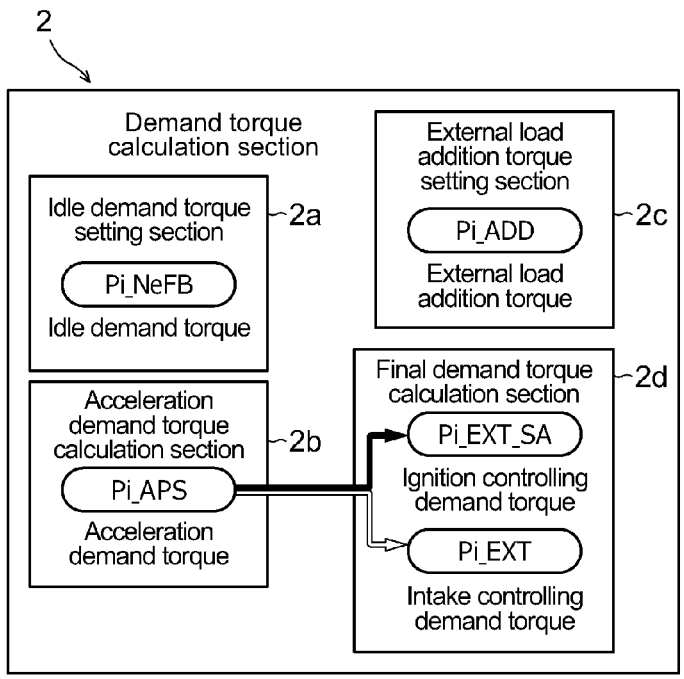
FIG. 2 is a block diagram illustrating a control value obtained by a demand torque calculation section of the controlling apparatus.

As shown in FIG. 2, the demand torque calculation section 2 includes an idle demand torque setting section 2a, an acceleration demand torque calculation section 2b, an external load addition torque setting section 2c and a final demand torque calculation section 2d.

The idle demand torque setting section 2a (idle speed setting unit, target torque setting unit) sets a target idle speed upon idling of the engine 10. The target idle speed is suitably set in response, for example, to the load of an air conditioner mounted on the vehicle, a cooling water temperature and so forth. Further, the idle demand torque setting section 2a sets a torque corresponding to the set target idle speed (torque demanded in order to maintain the engine speed Ne at the target idle speed) as an idle demand torque Pi_NeFB. The idle demand torque Pi_NeFB set here is transmitted to the target torque calculation section 3.

It is to be noted that reference character Pi in FIG. 2 signifies an indicated mean effective pressure Pi, and the magnitude of the torque is represented using the indicated mean effective pressure Pi. In the present embodiment, not only a moment of force generated by the engine 10 but also a torque corresponding amount (pressure corresponding to a torque) represented by a mean effective pressure acting upon the piston of the engine 10 (for example, the indicated mean effective pressure Pi or the brake mean effective pressure Pe) are referred to as torque for the convenience of description.

The acceleration demand torque calculation section 2b calculates acceleration demand torque Pi_APS based on the engine speed Ne obtained based on the angle $\theta_{CR}$ of the crankshaft and the operation amount $\theta_{AC}$ of the acceleration pedal.

The external load addition torque setting section 2c sets an external load addition torque Pi_ADD (torque value) having the magnitude corresponding to the steering angle θ_SAS detected by the steering angle sensor 8. Here, the external load addition torque Pi_ADD is set so as to have a value which increases as the steering angle θ_SAS increases. The external load addition torque Pi_ADD is a torque corresponding to the magnitude of the load applied to the engine 10 in response to a steering angle of the steering wheel. Accordingly, it is preferable to set the external load addition torque Pi_ADD taking a characteristic of the steering wheel and the engine 10 into consideration. The external load addition torque Pi_ADD set here is transmitted to the target torque calculation section 3.

The final demand torque calculation section 2d executes two types of calculation processes based on the acceleration demand torque Pi_APS calculated by the acceleration demand torque calculation section 2b. One of the processes is a process for calculating the ignition controlling demand torque Pi_EXT_SA as indicated by a black arrow mark in FIG. 2, and the other one of the processes is a process for calculating the intake controlling demand torque Pi_EXT as indicated by a blank arrow mark in FIG. 2. The ignition controlling demand torque Pi_EXT_SA and the intake controlling demand torque Pi_EXT are calculated independently of each other by the final demand torque calculation section 2d. The demand torques are torques aggregated taking an intention of the driver of the vehicle, a vehicle stability, a driving characteristic and so forth into consideration and are transmitted to the target torque calculation section 3.

[2-2. Target Torque Calculation Section, Control Section]

Figure 3:
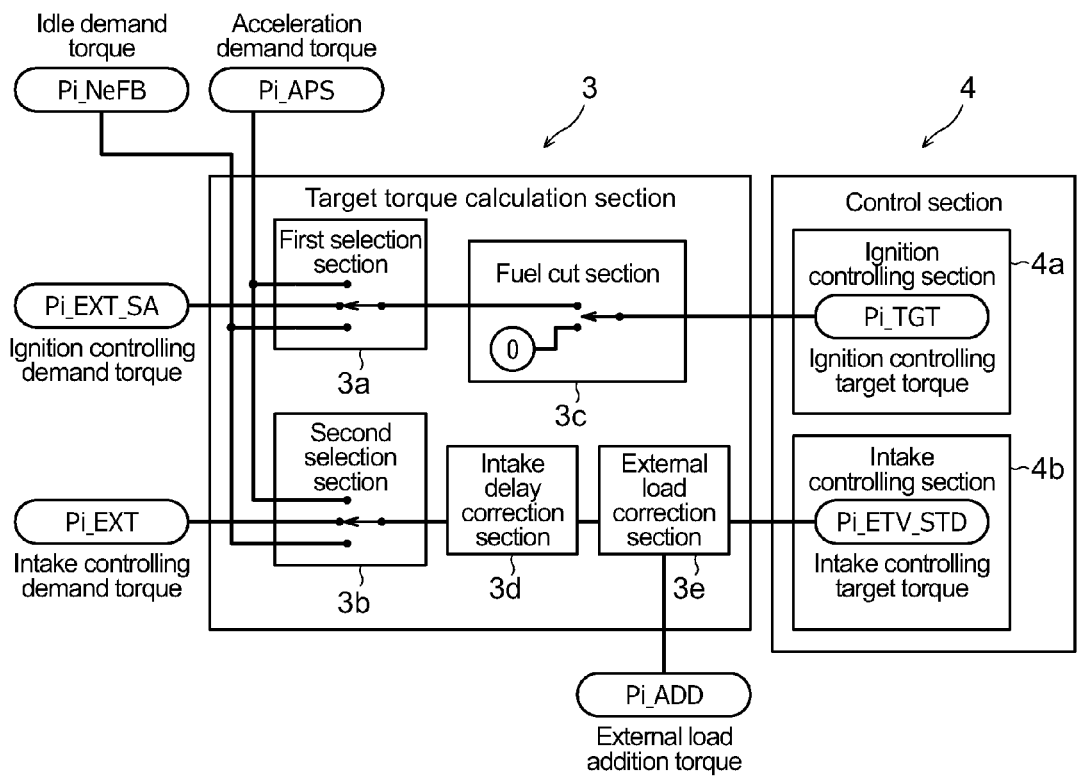
FIG. 3 is a block diagram illustrating a controlling process by a target torque calculation section and a control section of the controlling apparatus.

A calculation process by the target torque calculation section 3 and the control section 4 is illustrated in FIG. 3. The idle demand torque Pi_NeFB, acceleration demand torque Pi_APS, ignition controlling demand torque Pi_EXT_SA, intake controlling demand torque Pi_EXT and external load addition torque Pi_ADD calculated or set by the demand torque calculation section 2 are inputted to the target torque calculation section 3. The target torque calculation section 3 includes a first selection section 3a, a second selection section 3b, a fuel cut section 3c, an intake delay correction section 3d and an external load correction section 3e. Further, the control section 4 includes an ignition controlling section 4a and an intake controlling section 4b.

The first selection section 3a selects one of the ignition controlling demand torque Pi_EXT_SA, acceleration demand torque Pi_APS and the idle demand torque Pi_NeFB as a target value for the ignition controlling torque. Further, the second selection section 3b selects one of the intake controlling demand torque Pi_EXT, acceleration demand torque Pi_APS and idle demand torque Pi_NeFB as a target value for the intake controlling torque.

As a selection condition for the target value of the torque in the first selection section 3a and the second selection section 3b, for example, whether or not a demand for a torque from an external control system exists, whether or not idle operation of the engine 10 is necessary or the like is imaginable. The torque value selected by the first selection section 3a is transmitted to the fuel cut section 3c while the torque value selected by the second selection section 3b is transmitted to the intake delay correction section 3d.

The fuel cut section 3c sets the ignition controlling target torque Pi_TGT to zero upon carrying out of fuel cut control. By the fuel cut controlling section not shown, a carrying out condition for the fuel cut control is decided at any time based, for example, on the engine speed Ne, operation amount $\theta_{AC}$ of the acceleration pedal, engine cooling water temperature and so forth. Further, the fuel cut section 3c calculates the torque value selected by the first selection section 3a as it is as the ignition controlling target torque Pi_TGT when the fuel cut control is not carried out. The ignition controlling target torque Pi_TGT calculated here is transmitted to the ignition controlling section 4a of the control section 4.

The intake delay correction section 3d carries out correction calculation in response to an intake delay from the ETV 15. Here, a torque value with the intake delay taken into consideration is calculated based on the intake characteristic of the engine 10 or the ETV 15. It is to be noted that, for particular correction calculation by the intake delay correction section 3d, various methods are applicable in response to a controlling mode of the ETV 15. For example, the intake delay correction section 3d may carry out a first-order delay process and a second-order delay process simulating an actual intake delay for the torque value selected by the second selection section 3b in response to the operation condition or the selected demand torque to produce a locus of a torque variation to be implemented. The torque value calculated here is transmitted to the external load correction section 3e.

The external load correction section 3e adds the external load addition torque Pi_ADD to the inputted torque value to calculate the intake controlling target torque Pi_ETV_STD. In particular, the torque having the magnitude corresponding to the steering angle θ_SAS is added here to the torque value for the intake control. The intake controlling target torque Pi_ETV_STD calculated here is transmitted to the intake controlling section 4b of the control section 4.

The ignition controlling section 4a (ignition timing controlling unit) carries out ignition control for adjusting the ignition timing based on the ignition controlling target torque Pi_TGT. For example, the ignition controlling section 4a calculates an actual charging efficiency of a cylinder which is a controlling target as the actual charging efficiency Ec based on the intake air flow rate Q detected by the air flow sensor 7 and determines a timing of ignition for outputting the ignition controlling target torque Pi_TGT at the actual charging efficiency Ec from a map set in advance to control the ignition timing of the ignition plug 13.

Figure 6A:
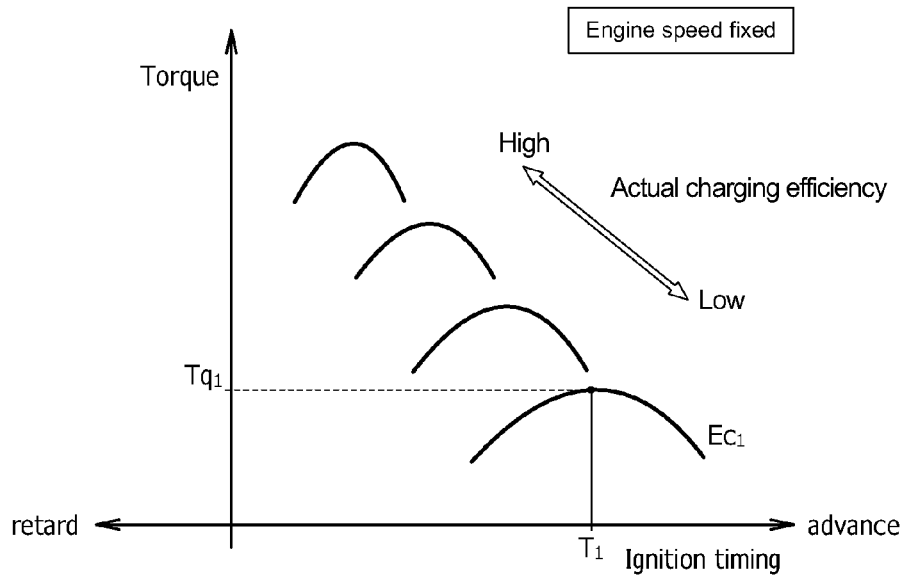
FIG. 6A is a view illustrating an example of a correspondence map among an actual charging efficiency Ec, an ignition timing and a torque according to the present controlling apparatus.

In this instance, such a corresponding relationship among the actual charging efficiency Ec, ignition timing and torque generated at a theoretical air fuel ratio as shown in FIG. 6A may be stored in advance into the ignition controlling section 4a as a map for each engine speed Ne so that the ignition timing is calculated using the map.

The map of FIG. 6A represents the magnitude of torque, which is generated in the case where only the ignition timing is changed at the fixed actual charging efficiency Ec in the same combustion condition (for example, in the condition that the engine speed and the air fuel ratio are fixed), as a graph and indicates such graphs at different actual charging efficiencies Ec in an overlapping relationship with each other. At a fixed actual charging efficiency Ec, the torque on the axis of ordinate exhibits an upwardly convex curved line with respect to the variation of the ignition timing on the axis of abscissa. The ignition timing corresponding to the coordinate of the top of this graph is the MBT (Minimum spark advance for Best Torque). Further, if the actual charging efficiency Ec increases, then the torque generated by the engine 10 increases and the combustion speed (flame propagation speed in the cylinder) increases due to increase of the amount of air introduced into the cylinder. Consequently, the MBT moves in the delay angle (retard) direction.

For example, if the actual charging efficiency Ec calculated from the intake flow rate Q is a first predetermined value Ec1, the ignition timing at which a maximum torque is obtained is $T_1$, and the torque generated by the engine 10 at this time is $Tq_1$. Accordingly, in the case where the engine speed Ne coincides with the condition illustrated in FIG. 6A and the actual charging efficiency Ec is the first predetermined value Ec1 and besides the ignition controlling target torque Pi_TGT is $Tq_1$, the ignition plug 13 may be controlled so that the ignition timing may become $T_1$.

On the other hand, if the ignition controlling target torque Pi_TGT is lower than $Tq_1$, then the ignition timing should be moved (retarded) in the delay angle direction to a timing corresponding to the value of the ignition controlling target torque Pi_TGT. It is to be noted that, in the graph of FIG. 6A, the ignition controlling target torque Pi_TGT can be obtained also by moving (advancing) the ignition timing in the lead angle (advance) direction with respect to $T_1$. However, from a point of view of prevention of knocking of the engine 10, preferably the ignition timing is moved in the delay angle direction with respect to the MBT.

The intake controlling unit 4b (intake air amount controlling section) carries out intake control for adjusting the opening of the ETV 15 based on the intake controlling target torque Pi_ETV_STD. For example, the intake controlling section 4b calculates the amount of air in the cylinder necessary to obtain the intake controlling target torque Pi_ETV_STD and controls the opening of the ETV 15 so that the amount of air may be introduced into the cylinder of the controlling target.

As seen in FIG. 3, in the target torque calculation section 3 and the control section 4, the external load addition torque Pi_ADD is used only for the calculation process of the intake controlling target torque Pi_ETV_STD but is not used for the calculation process of the ignition controlling target torque Pi_TGT. Accordingly, the amount of air to be introduced into the engine 10 is increased in response to the steering angle θ_SAS while the ignition timing by the ignition plug 13 is controlled based on the ignition controlling target torque Pi_TGT which is determined without taking the steering angle θ_SAS into consideration.

[3. Flow Chart]

Figure 4A:
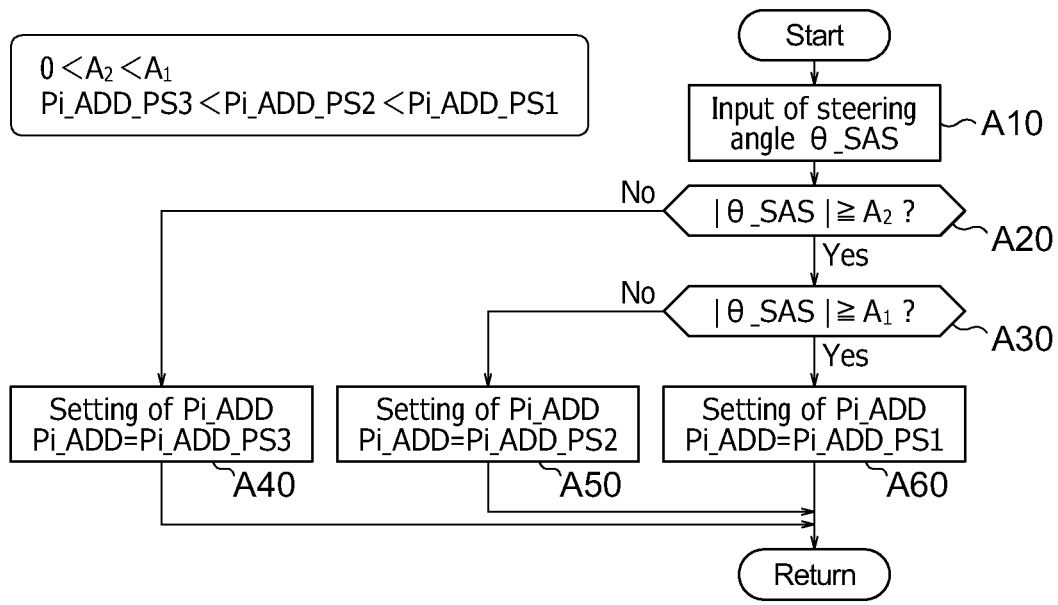
FIG. 4A is a flow chart illustrating a controlling procedure by the demand torque calculation section of the controlling section and is a flow chart where an external load addition torque is set stepwise.
Figure 4B:
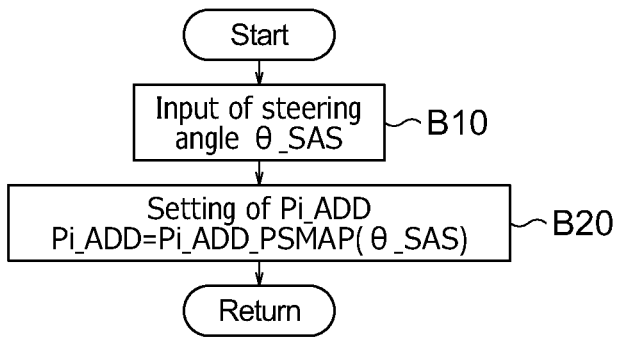
FIG. 4B is a flow chart illustrating another controlling procedure by the demand torque calculation section of the controlling apparatus and is a flow chart where an external load addition torque is set using a map.

An example of a controlling procedure executed by the demand torque calculation section 2 is illustrated in flow charts of FIGS. 4A and 4B.

FIG. 4A is a flow chart in the case where the external load addition torque setting section 2c sets the external load addition torque Pi_ADD stepwise. A first reference value A1 and a second reference value A2 used for condition decision in the flow charts are threshold values used for decision of the steering angle θ_SAS and satisfy 0<A2<A1. Further, three kinds of the external load addition torque Pi_ADD are set here and have a relationship in magnitude of Pi_ADD_PS3<Pi_ADD_PS2<Pi_ADD_PS1.

At step A10, the steering angle θ_SAS detected by the steering angle sensor 8 is inputted to the external load addition torque setting section 2c. At subsequent step A20, it is decided whether or not the absolute value |θ_SAS| of the steering angle is equal to or higher than the second reference value A2. If |θ_SAS|<A2 here, then it is decided that the operation amount of the steering wheel from its neutral position is comparatively small, and the processing advances to step A40. At step A40, the external load addition torque Pi_ADD is set to Pi_ADD_PS3 which is the lowest value. On the other hand, if |θ_SAS|≥A2, then the processing advances to step A30.

Figure 5A:
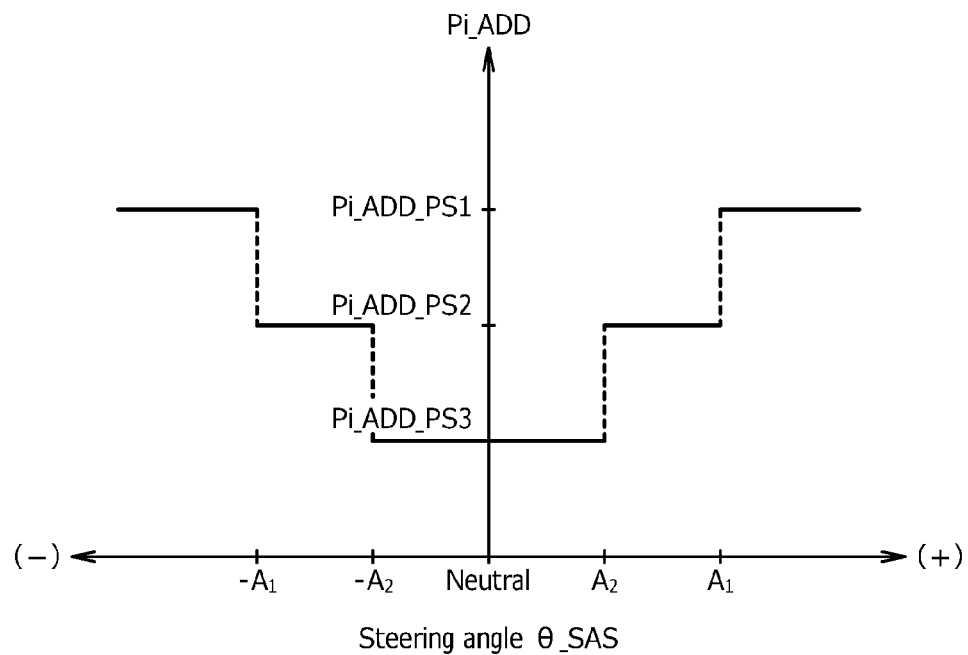
FIG. 5A is a graph illustrating a relationship between the external load addition torque and the steering angle set by the controlling apparatus and corresponds to a case in which the external load addition torque is set stepwise.

At step A30, it is decided whether or not the absolute value |θ_SAS| of the steering angle is equal to or higher than the first reference value A1 which is higher than the second reference value A2. Here, if |θ_SAS|<A1 (that is, A2≤|θ_SAS|<A1), then the processing advances to step A50, at which the external load addition torque Pi_ADD is set to Pi_ADD_PS2 which is a rather high value. On the other hand, if |θ_SAS|≥A1, then it is decided that the operation amount of the steering wheel is comparatively great, and the processing advances to step A60, at which the external load addition torque Pi_ADD is set to Pi_ADD_PS1 which is the highest value. According to the relationship between the external load addition torque Pi_ADD and the steering angle θ_SAS set in the flow chart, the external load addition torque Pi_ADD increases stepwise as the operation amount of the steering wheel in the leftward or rightward direction increases as seen in FIG. 5A.

Figure 5B:
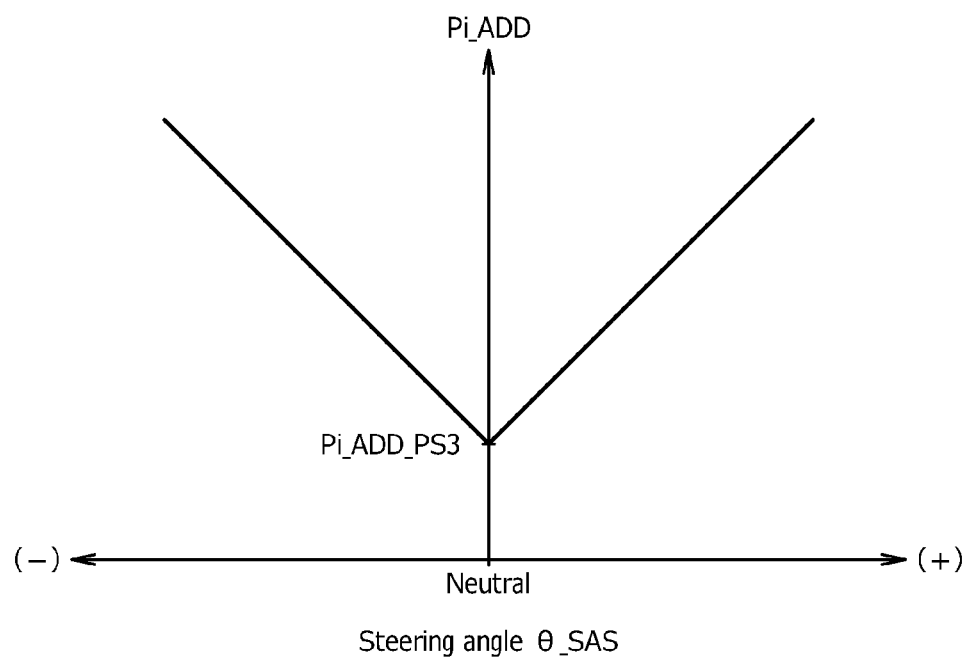
FIG. 5B is a graph illustrating another relationship between the external load addition torque and the steering angle set by the controlling apparatus and corresponds to a case in which the external load addition torque is set continuously.

Meanwhile, FIG. 4B is a flow chart in the case where the external load addition torque setting section 2c sets the external load addition torque Pi_ADD using a map, a table or the like set in advance. In this instance, in the external load addition torque setting section 2c, such a correspondence relationship between the external load addition torque Pi_ADD and the steering angle θ_SAS as seen in FIG. 5B is stored in advance.

At step B10, the steering angle θ_SAS detected by the steering angle sensor 8 is inputted to the external load addition torque setting section 2c. Then at step B20, an external load addition torque Pi_ADD corresponding to the steering angle θ_SAS inputted at the preceding step is read out from the map, which is Pi_ADD_PSMAP (θ_SAS), illustrated in FIG. 5B.

The external load addition torque Pi_ADD obtained in this manner is added to the torque value transmitted from the intake delay correction section 3d by the external load correction section 3e of the target torque calculation section 3. Consequently, as the absolute value |θ_SAS| of the steering angle increases, the intake controlling target torque Pi_ETV_STD increases. In other words, the intake controlling section 4b controls the opening of the ETV 15 such that, as the absolute value |θ_SAS| of the steering angle increases, the amount of air introduced into the cylinder increases.

[4. Working, Effect]

A variation of the torque behavior when the external load addition torque Pi_ADD increases by the control described above is described.

Figure 6B:
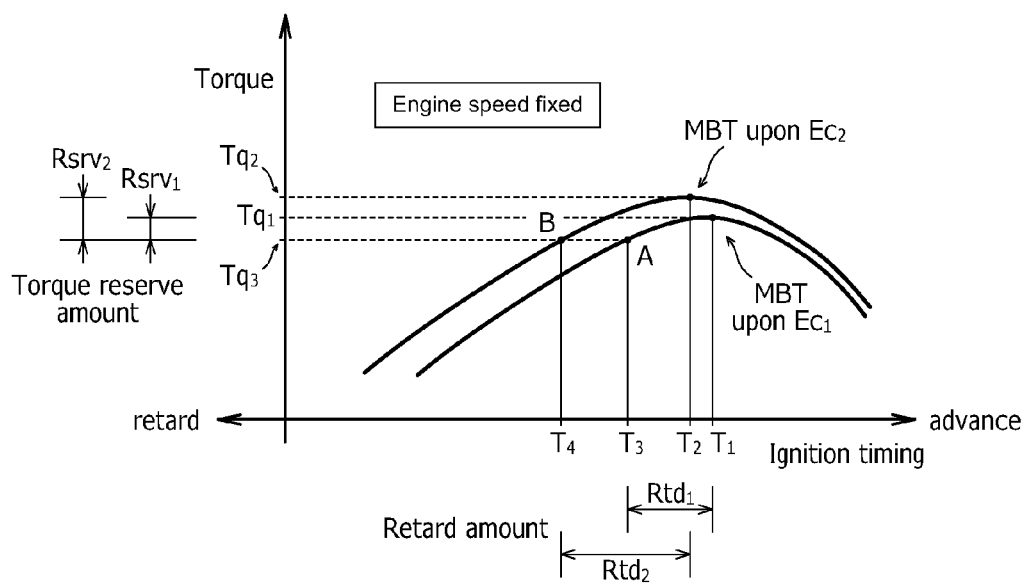
FIG. 6B is an enlarged view illustrating maps extracted from FIG. 6A when the actual charging efficiency Ec is equal to a first predetermined value $Ec_1$ and a second predetermined value $Ec_2$.

When the engine 10 is in an idle state and the actual charging efficiency Ec has the first predetermined value Ec1 while the ignition controlling target torque Pi_TGT is $Tq_3$ as seen in FIG. 6B, the ignition timing is set to $T_3$ corresponding to the point A. In the control state of the point A, the ignition timing moves in the delay angle direction from $T_1$ which is the MBT when the actual charging efficiency Ec exhibits the first predetermined value Ec1, and the retard amount $Rtd_1$ is $T_1-T_3$. Meanwhile, a torque reserve amount $Rsrv_1$ at the point A (that is, a margin for a torque which can be increased by the ignition control, and a barometer regarding by what degree the torque can be increased instantaneously) is $Tq_1-Tq_3$ which is a difference of the torque at the point A from the torque at the MBT.

Here, if the steering wheel is operated by a great amount to increase the absolute value |θ_SAS| of the steering angle, then the external load addition torque Pi_ADD increases in response to this. Further, the external load addition torque Pi_ADD is added to the torque value transmitted from the intake delay correction section 3d by the external load correction section 3e. Consequently, the intake controlling target torque Pi_ETV_STD increases, and the opening of the ETV 15 is controlled so as to increase the amount of air to be introduced into the cylinder by the intake controlling section 4b. Further, together with this, the intake flow rate Q increases and also the actual charging efficiency Ec increases. It is assumed that the actual charging efficiency at this time is a second predetermined value Ec2 as seen in FIG. 6B.

On the other hand, in the calculation process of the ignition controlling target torque Pi_TGT by the target torque calculation section 3 and the control section 4, the external load addition torque Pi_ADD is not used. In other words, even if the external load addition torque Pi_ADD increases, the ignition controlling target torque Pi_TGT does not vary from $Tq_3$. Accordingly, the ignition timing is set to $T_4$ corresponding to the point B as seen in FIG. 6B. The retard amount $Rtd_2$ at the point B is $T_2-T_4$, and the torque reserve amount $Rsrv_2$ is $Tq_2-Tq_3$.

Since the torque generated by the engine 10 increases as the actual charging efficiency Ec increases as described above, $Tq_2$ is greater than $Tq_1$. Accordingly, the torque reserve amount $Rsrv_2$ is greater than the torque reserve amount $Rsrv_1$, and consequently, the margin of the torque increases by the increase of the external load addition torque Pi_ADD. On the other hand, since the ignition controlling target torque Pi_TGT does not vary from $Tq_3$, the magnitude of the torque actually outputted from the engine 10 does not vary while only the torque reserve amount increases. Accordingly, a torque shock does not occur by an operation of the steering wheel.

In this manner, with the controlling apparatus for the engine 10, since the ignition timing is controlled based on the steering angle θ_SAS, torque-based control taking a load fluctuation caused by a steering operation into consideration can be implemented. It is to be noted that, upon idling in which a fluctuation of the engine speed Ne is liable to be caused by a load fluctuation by a steering operation, the idle stability can be improved.

Further, with the controlling apparatus for the engine 10, the external load addition torque Pi_ADD is set so as to increase as the steering angle θ_SAS increases, that is, as the load fluctuation by a steering operation increases, and this is directly reflected on the intake controlling target torque Pi_ETV_STD. In this manner, by increasing the external load addition torque Pi_ADD, the ignition timing can be retarded to increase the torque reserve amount and the stability of the engine 10 against the load fluctuation can be improved. Further, in the case where the external load addition torque Pi_ADD is low, the retard amount of the ignition timing becomes small corresponding to this, and therefore, the combustion state of the engine 10 can be made nearer to that at the MBT. Consequently, the fuel cost can be improved.

Particularly in the case where the external load addition torque Pi_ADD is set stepwise as seen in FIG. 4A and FIG. 5A, simplification of the controlling configuration is possible and mounting is easy, and besides, the cost required for mounting can be reduced.

It is to be noted that, even if the ignition timing is retarded without increasing the intake controlling target torque Pi_ETV_STD, the torque reserve amount increases. However, in this instance, the actual output torque of the engine 10 decreases in comparison with that before the ignition timing is retarded. In contrast, in the present controlling apparatus for the engine 10, control for increasing the intake amount is carried out simultaneously with retarding of the ignition timing, and a decreasing amount of the torque by the retarding of the ignition timing is compensated for by increasing the actual charging efficiency Ec. Accordingly, the torque reserve amount can be increased without causing the actual output torque of the engine 10 to fluctuate, and the stability against the load fluctuation can be improved.

Further, the present controlling apparatus for the engine 10 includes a calculation process which causes, when the control of increasing the intake air amount is carried out simultaneously with retarding of the ignition timing, increase of the external load addition torque Pi_ADD to be reflected only on the intake controlling target torque Pi_ETV_STD but not on the ignition controlling target torque Pi_TGT. By increasing only the intake controlling target torque Pi_ETV_STD, a maximum torque obtained at the MBT can be increased with certainty. In other words, the torque reserve amount can be increased with certainty without causing the actual output torque of the engine 10 to fluctuate, and the robustness of the control can be improved.

In other words, by setting a torque value (external load addition torque Pi_ADD) based on the steering angle $\theta$_SAS and controlling the intake air amount with a torque (intake controlling target torque Pi_ETV_STD) corresponding to the torque value and besides controlling the ignition timing to a timing corresponding to the target torque (ignition controlling target torque Pi_TGT), the maximum torque obtained at the MBT can be increased. In other words, the torque reserve amount can be increased readily without causing the actual output torque to fluctuate taking a load fluctuation caused by a steering operation upon idle control into consideration.

[5. Modifications, Etc.]

The present invention can be carried out in various modified forms without departing from the spirit and scope thereof irrespective of the embodiments thereof described hereinabove. The configurations of the present embodiment can be selectively used or removed as occasion demands or can be combined suitably.

While, in the embodiment described hereinabove, the engine ECU 1 includes the functions of the demand torque calculation section 2, target torque calculation section 3 and control section 4, the particular controlling configuration of the engine ECU 1 is not limited to this. For example, if an electronic controlling apparatus includes a unit (setting units) for setting an equivalent to the external load addition torque Pi_ADD of a magnitude corresponding to the steering angle $\theta$_SAS and setting a target torque of the engine 10 in response to the equivalent and a unit (control unit) for controlling the ignition timing so that the target torque may be outputted from the engine 10, then the technical effects described hereinabove are exhibited. Accordingly, the particular controlling configuration suitably allows addition or simplification.

Further, while, in the embodiment described hereinabove, two kinds of torques including the ignition controlling target torque Pi_TGT for ignition control and the intake controlling target torque Pi_ETV_STD for intake control are calculated in parallel in the torque-based control of the engine 10, at least the ignition controlling target torque Pi_TGT for ignition control should be calculated. For example, control of decreasing the ignition controlling target torque Pi_TGT in response to the external load addition torque Pi_ADD to retard the ignition timing to increase the torque reserve amount is carried out. By such control configuration, control taking a load fluctuation caused by a steering operation into consideration can be implemented similarly to the embodiment described hereinabove.

Further, while the external load addition torque Pi_ADD in the embodiment described hereinabove is set stepwise or gradually increases in response to the absolute value |$\theta$_SAS| of the steering angle as seen in FIG. 5A or 5B, the external load addition torque Pi_ADD may particularly be set arbitrarily. As described hereinabove, the external load addition torque Pi_ADD can be set taking a characteristic of the steering wheel or the engine 10 into consideration.

It is to be noted that the combustion type of the engine 10 in the embodiment described above can be set arbitrarily. The present invention can be applied to general engines for which torque-based control is carried out and can be applied also to a lean burn engine, an engine having a variable valve lift mechanism and so forth.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

REFERENCE SIGNS LIST

1: Engine ECU
2: Demand torque calculation section
2a: Idle demand torque setting section (Idle speed setting unit, Target torque setting unit)
2b: Acceleration demand torque calculation section
2c: External load addition torque setting section
2d: Final demand torque calculation section
3: Target torque calculation section (Torque value setting unit)
3a: First selection section
3b: Second selection section
3c: Fuel cut section
3d: Intake delay correction section
3e: External load correction section
4: Control section
4a: Ignition controlling section (Ignition timing controlling unit)
4b: Intake controlling section (Intake air amount controlling unit)
5: acceleration pedal sensor
6: crank angle sensor
7: air flow sensor
8: steering angle sensor (steering angle detection unit)
10: engine
11: intake path
12: exhaust path
13: ignition plug
14: injector
15: electric throttle valve

What is claimed is:

1. An engine controlling apparatus, comprising:
an idle speed setting unit that sets a target idle speed upon idling of an engine mounted on a vehicle;
a target torque setting unit that sets a target torque in response to the target idle speed set by said idle speed setting unit;
an ignition timing controlling unit that controls an ignition timing of the engine and an intake air amount controlling unit that controls an intake air amount of the engine so that the target torque set by said target torque setting unit is implemented;
a steering angle detection unit that detects a steering angle of a steering wheel of the vehicle; and a torque value setting unit that sets a torque value larger as the steering angle detected by said steering angle detection unit increases; wherein said intake air amount controlling unit increases the intake air amount as sum of the target torque and the torque value increases, said ignition timing controlling unit retards the ignition timing so that the engine outputs the target torque set by said target torque setting unit, the control for increasing the intake air amount is carried out simultaneously with retarding of the ignition timing, and the torque value set by the torque value setting unit is reflected only to the intake air amount but not to the ignition timing.

2. The engine controlling apparatus according to claim 1, wherein said torque value setting unit increases the torque value in a stepwise manner as an absolute value of the steering angle detected by said steering angle detection unit exceeds threshold values.

* * * * *